Sept. 21, 1965  C. GAGNIERE  3,207,951
SYSTEM AND DEVICE FOR THE PROTECTION OF ELECTRIC NETWORKS
Filed April 7, 1960  6 Sheets-Sheet 3

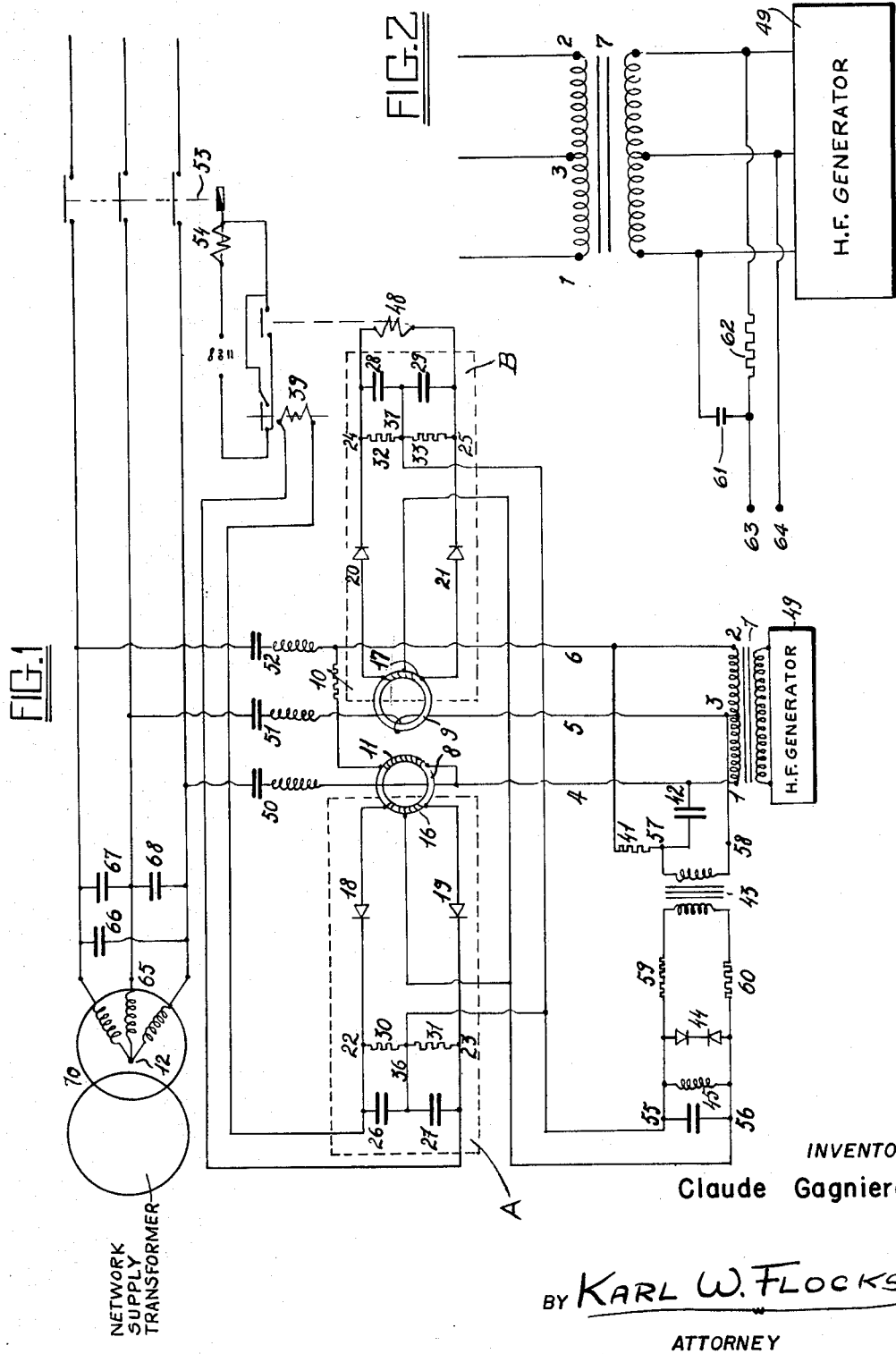

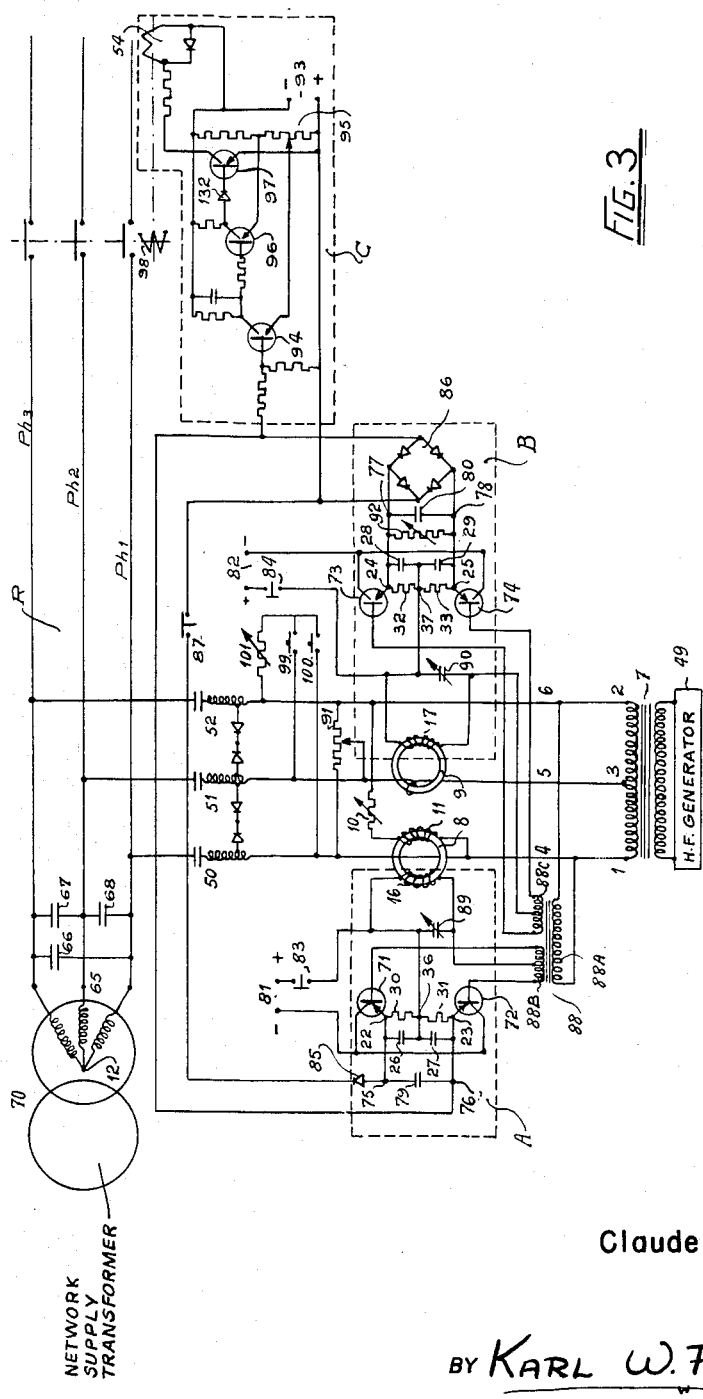

INVENTOR
CLAUDE GAGNIERE
Karl W. Flocks
ATTORNEY

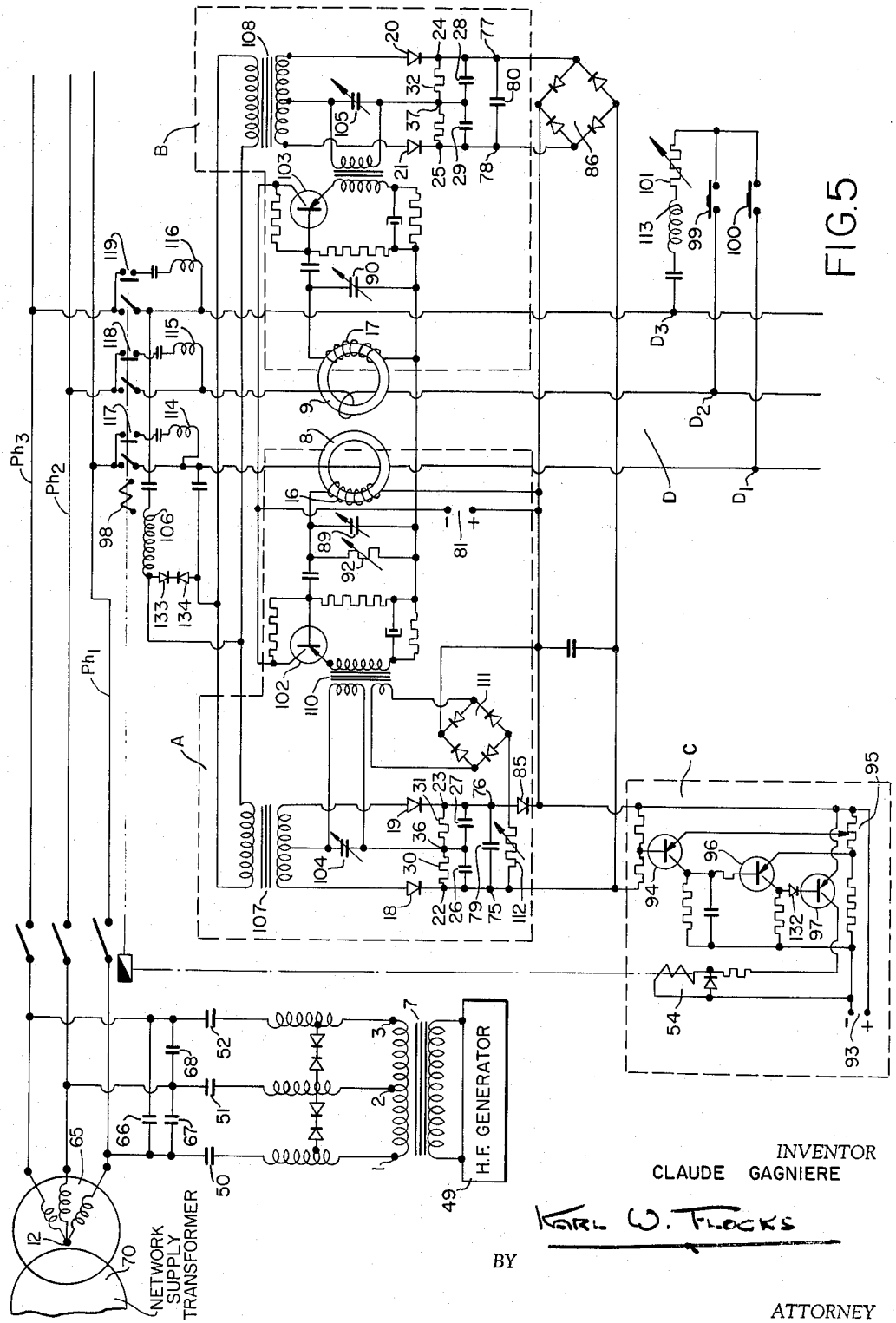

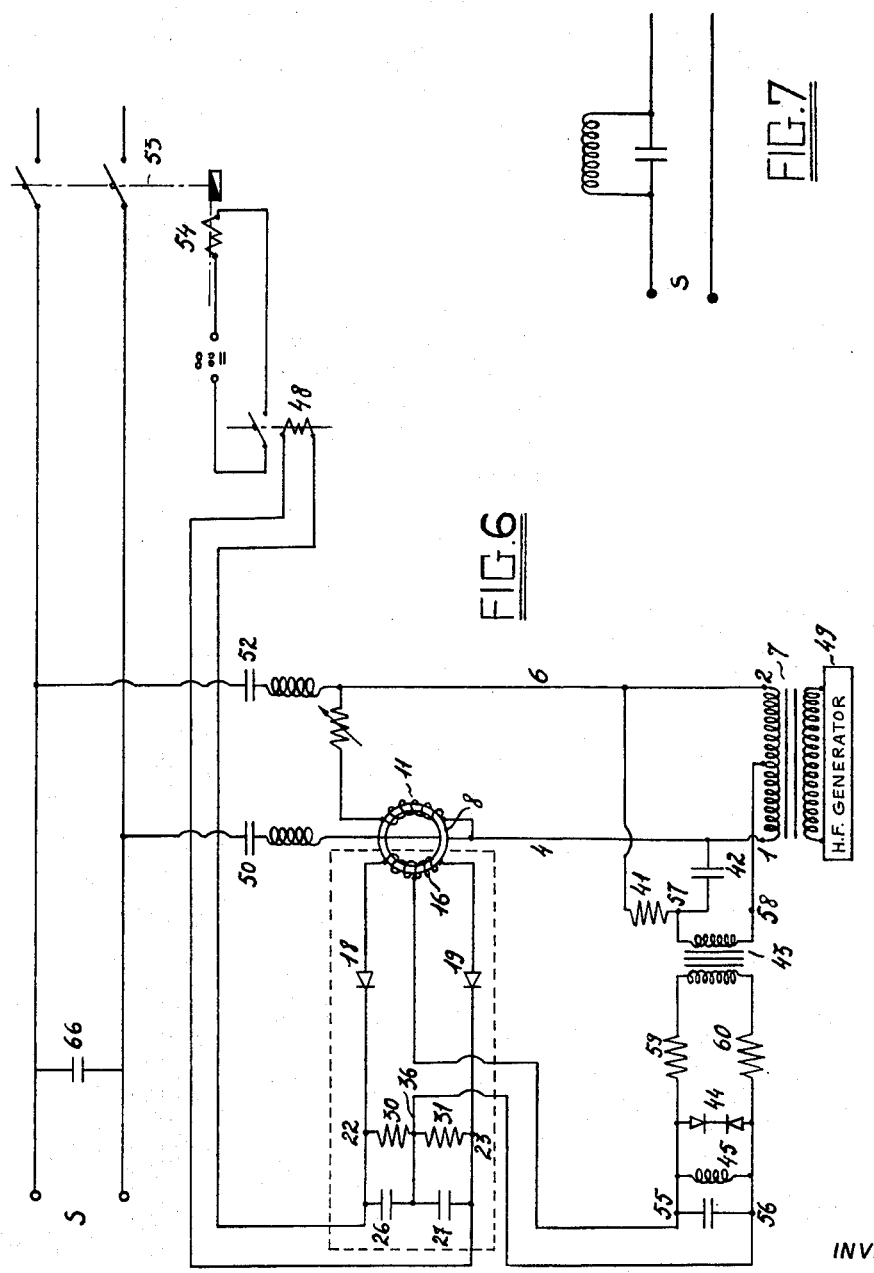

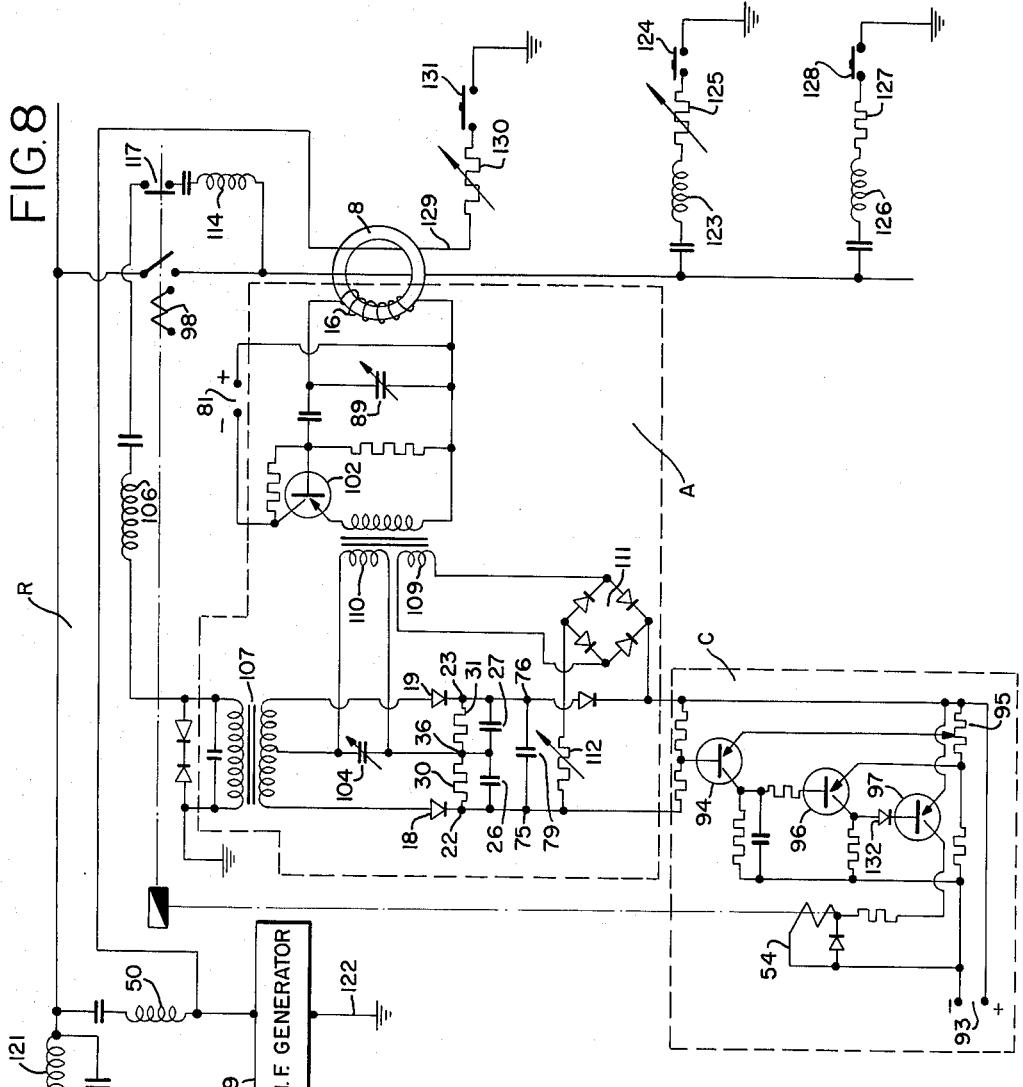

United States Patent Office 3,207,951
Patented Sept. 21, 1965

3,207,951
SYSTEM AND DEVICE FOR THE PROTECTION
OF ELECTRIC NETWORKS
Claude Gagniere, Creil, France, assignor to Charbonnages
de France, Paris, France, a public institution of France
Filed Apr. 7, 1960, Ser. No. 20,736
Claims priority, application France, Apr. 9, 1959,
791,621, 791,622; Feb. 16, 1960, 818,629
17 Claims. (Cl. 317—9)

The present invention relates to improved systems for the protection of electrical networks against short circuits in which the intensity of a monitoring current of much higher frequency than the normal industrial frequency is detected by actuating the network cut-off means through a means selective of the active or purely resistive intensity component.

There has been disclosed in my copending application, Serial No. 787,973, filed January 20, 1959, entitled "Protection Device for Electric Networks" devices for the protection of electrical networks enabling, under normal working conditions, limitation of the high frequency current intensity injected into the network being protected. This is accomplished by connecting a set of capacitances between the phases of the network thereby allowing the detuning of the unit, formed by the secondary of the transformer supplying the network and the set of capacitances, to the injected high frequency.

Although a good coupling may exist between the set of capacitances and the secondary of the network transformer, there continues to exist in the network transformer a current, due to the iron and Joule losses, which causes the generator of the high frequency injected current to furnish power which is transformed into an active current of measurable intensity. If it is desired to install current transformers to supply fault detectors connected between the high frequency generator and the protected network, the normal service current drawn off by the loads in the network, which act to limit the sensitivity of the protective device must be taken into account.

Therefore, conditions exist in the prior devices which do not allow the most sensitive detection position to be found in the connection between the high frequency generator and the protected network, but only on the network itself. It is necessary in those cases to use only unsaturated transformers in order not to weaken the transmission of the high frequency signal by the current transformers. This results in practical difficulties in the installation of the necessary protective equipment in the network transformer housings, already fully occupied by other equipment.

Accordingly, the present invention is directed to a protective system for electrical networks which overcomes the drawbacks of prior art systems and allows the most sensitive detection position to be located in the connection between the high frequency generator and the protected network.

Therefore, it is the object of this invention to provide a system of protection for electrical networks allowing detection in the connection between the high frequency generator and the protected network, of current flowing in the part of the network which is to be protected, to the exclusion of the current flowing in the transformer supplying the network.

It is also an object of this invention to provide a system of protection for electrical networks enabling the use of a monophased frequency generator for the control of a triphased network.

Furthermore, it is an object of this invention to provide a system of protection for electrical networks wherein the fault current is detected through the active component of its intensity.

It is a further object of this invention to provide a greatly simplified system of protection for electrical networks wherein all the influence of the monitoring high frequency current generator in the detection of the purely reactive current intensity flowing in the network is eliminated.

The invention also seeks to provide a system for the protection of electrical networks which may be used in a network of variable length and therefore of variable capacitance, and also to enable a monitoring relay to have a pre-selected and variable sensitivity where the measured value for actuating this relay is strictly independent of either the capacitance or the inductance of the electrical network.

Further features and advantages of the present invention will become clear on reading the following description with reference to the accompanying drawings, showing, merely by way of explanation and without any intention of limitation, various possible embodiments of the invention.

In these drawings:

FIGURE 1 is the circuit diagram of a device for the non-selective protection of a three-phase network, designed in accordance with the invention;

FIGURE 2 is a detail of an alternative embodiment of the circuit diagram of the device for drawing off a constant phase difference reference voltage;

FIGURE 3 is the circuit diagram of an alternative embodiment of the non-selective protection device of FIGURE 1 for a three-phase network;

FIGURE 5 is the circuit diagram of a selective protection device for a three-phase network, designed in accordance with the invention;

FIGURE 6 shows the circuitry of a non-selective protection device for a single-phase network, designed in accordance with the invention;

FIGURE 7 is a detail showing one manner in which the monitoring current can be decoupled from the source in the case of a D.C. network protected as illustrated in FIGURE 6;

FIGURE 8 is the circuit diagram of a selective-protection device for an A.C. network; and FIGURE 9 shows one modification of a detail in the circuit of FIGURE 8.

Figure 4:
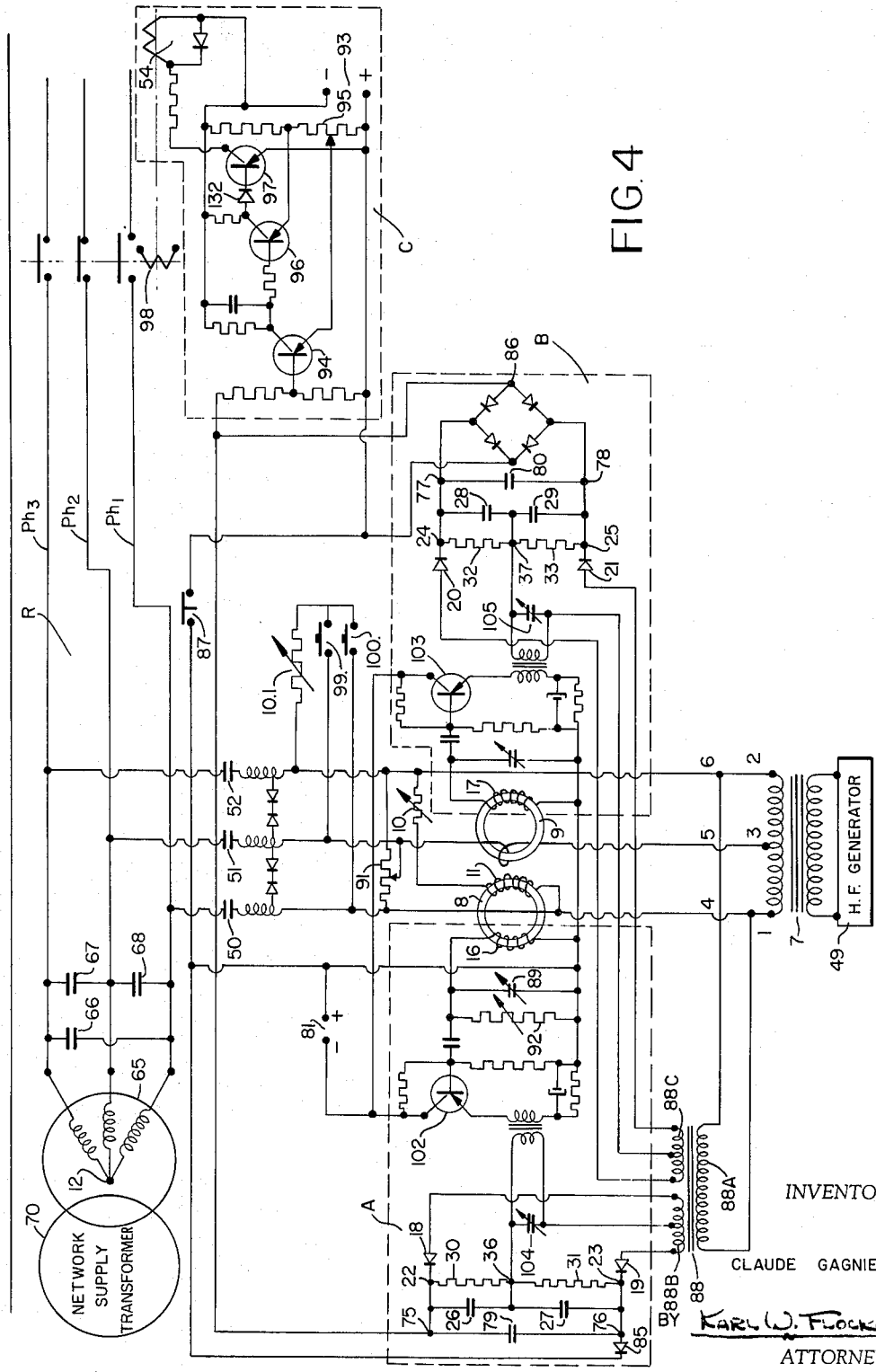
FIGURE 4 is the circuit diagram of a further alternative embodiment of the non-selective protection device of FIGURE 1 for a three-phase network.

In FIGURE 1 a network is shown fed by a transformer 70. To the terminals of the secondary winding 65 of this transformer are connected capacitors 66, 67, 68 forming, with the inductance of transformer 70, rejector circuits tuned to the frequency of the monitoring voltage injected into the network by a single-phase generator 49. The connection between the generator and the network, which is effected by way of filters 50, 51, 52 consisting of acceptor circuits or inductor-capacitor units mounted in series and tuned to the monitoring frequency, is set up as follows: two of the network phases are connected to the ends 1 and 2 of the secondary winding of the output transformer 7 of the generator, and the third phase is connected to the center tap 3 of the secondary winding.

On one of the two conductors connected to the ends of the output transformer 7, conductor 4, and on the conductor 5 connected to the center tap of this transformer, are mounted two current intensity transformers 8 and 9. The current intensity transformer 9 has a primary winding of double the number of turns than that of the primary winding of transformer 8. Without such an arrangement, a short-circuit between the phases connected to conductors 4 and 5 or 5 and 6 would result in the secondary of transformer 9 being at a voltage which is half of the voltage across the terminals of the secondary of transformer 8 for a short-circuit of the same resistance between the phases connected to the conductors 4 and 6. On transformer 8 there is mounted an additional winding 11 enabling compensation of the active current component flowing in the network supply transformer 70. The adjustment of this current is achieved by means of the rheostat 10. It is not usually necessary to compensate for the current in the current intensity transformer 9, since, under normal operating conditions, the supply transformer has identical losses on each of its phases and the connection 3–12 between the center tap of the secondary of transformer 7 and the neutral point 12 of the secondary of transformer 70 is an equipotential connection.

The monitoring frequency current flowing through the transformer 70 is an active current which supplies the heat and core losses. This active current flowing through the primary winding 4 of current intensity transformer 8 induces ampere-turns into the secondary winding 16 of said transformer 8. These ampere-turns are the product of the number of turns of secondary winding 16 by the current induced by primary winding 4 flowing through said secondary winding.

The value of the current induced by primary winding 4 into secondary winding 16 is small, since it appears in the secondary winding of the current intensity transformer. These ampere-turns are compensated for by the compensating ampere-turns produced by the flowing of a compensating monitoring frequency current in winding 11. The value of that compensating current is all the smaller as the number of turns of winding 11 is greater, and that value is adjusted by means of a rheostat 10, in series with winding 11, so that the compensating ampere-turns are equal to, but in opposite direction with, the ampere-turns induced into winding 16 by the active current flowing into primary winding 4.

If it is also deemed necessary to compensate for the active current component flowing in the current transformer 9, an additional winding is mounted on the latter in the circuit of which a variable rheostat is connected. In this particular case the variable rheostats are connected in series so as to form an auxiliary network of variable resistances enabling the generator-detector-compensator unit to be adapted to the ohmic characteristics of the power supply source.

It is interesting to note that in supplying compensation, not in the primary of the detection transformers as is the case in some known systems, but in an additional secondary winding of said detection transformers wherein the consumption of purely resistive current in the network only gives rise to a small intensity to be compensated, the resulting power consumption of the compensation circuit is extremely small.

The two extremities of the coils 16 and 17 of the secondary windings of the current transformers 8 and 9 are each connected, through two diodes 18, 19 and 20, 21 respectively, to the ends 22, 23 and 24, 25 of a unit comprising capacitors (26, 27 and 28, 29) and resistors (30, 31 and 32, 33). A reference voltage, $V_{tr}$, of constant phase difference with respect to the voltage $V_{1-2}$ across terminals 1 and 2 of output transformer 7 is applied between the center tap of the coils 16, 17 and the midpoints 36, 37 of the capacitor-resistor units. One of the features of this circuitry is to supply the terminals 22, 23 and 24, 25 with a voltage whose D.C. component $V_{dc}$ is a function of the product $V_{tr} \times V_s \times \cos \gamma$ ($V_s$ being the voltage at the terminals of the secondary winding of the current transformer 9 and $\gamma$ being the phase angle between $V_{tr}$ and $V_s$). Since $V_s$ is proportional to I (I being the alternating current flowing in the generator-network connection) and if $\gamma = \phi$ ($\phi$ being the phase angle between $V_{1-2}$ and I), this being obtained by dephasing $V_{tr}$ with respect to $V_{1-2}$ by the same phase angle as between $V_s$ and I, then: $V_{dc}$ is a function of ($V_{tr} \times I \cos \phi$).

Since: $I \cos \phi = Iw$ ($Iw$ being the active component of the current I), therefore: $V_{dc}$ is a function of ($V_{tr} \times Iw$).

In accordance with one possible embodiment shown by way of example in FIGURE 1, the reference voltage $V_{tr}$ is taken from the terminals 57 and 58 of the dephasing circuit consisting of a resistor 41—capacitor 42 unit connected to the terminals of the secondary winding of the output transformer 7 of the generator. Alternatively, this voltage $V_{tr}$ can equally be taken from the terminals 63 and 64 (see FIGURE 2) of a dephasing circuit comprising a resistor 62—capacitor 61 unit connected to the terminals of the primary winding of transformer 7.

If it is desired that the voltage $V_{dc}$ should be solely a function of the purely resistive current component, a reference voltage $V_{tr}$ is applied between the terminal 36 and the center tap of the coil 16 and between the center tap of the coil 17 and the terminal 37, this reference voltage $V_{tr}$ being of constant amplitude obtained as follows, this being a further alternative embodiment of the invention.

The voltage taken from the terminals 57, 58 of the dephasing circuit is amplified by means of a transformer 43 and then limited by the Zener effect diodes 44, preceded in the circuitry by two current limiting resistors 59, 60, and thereafter filtered by the rejector circuit 45 which is tuned to the monitoring frequency. The ratio of the transformer 43 is such that when a plain short-circuit occurs in the network the voltage at the terminals of the diodes 44 is slightly higher than their Zener voltage, since even in the case of a plain short-circuit the voltage $V_{1-2}$ at the terminals of the transformer 7 is not zero due to the resistance of the filters 50, 51, 52.

The relays 39 and 48 connected between the terminals 22, 23 and 24, 25 are energized when the voltage $V_{dc}$ reaches a certain value and cause the network cut-off device 53 to be actuated through an auxiliary relay 54. The relays 39 and 48 can be advantageously replaced by an electronic device enabling the response time to be considerably reduced, as will be described in detail further on.

The device which has just been described operates as follows:

If the inductances of the transformer 70 are tuned to the monitoring frequency by means of the capacitors 66, 67, 68, the monitoring frequency current which is flowing through the transformer 70 is a purely resistive current supplying the transformer's heat and core losses. As we have already seen the ampere-turns produced by this current in the current transformer 8 (and possibly in the current transformer 9) are compensated for by means of an auxiliary winding 11.

In the general case of a network supplying rotary equipment, the impedances at the monitoring frequency are substantially pure reactances; the voltages $V_s$ and $V_{tr}$ will be out of phase by 90° and the voltage $V_{dc}$ at the terminals 22, 23 and 24, 25 will be substantially zero, even in the case of a very extensive network (high line capacities) and numerous and high-powered motors.

In contrast, if a short-circuit occurs at any point of the network between two phases (mono-phased short-circuit) or between three phases (tri-phased short-circuit), the resulting current will have a large active component and a voltage $V_{dc}$ will appear at the terminals 22, 23 and 24, 25 causing the relay 39 or 48 to be energized and the cut-off device 53 to be operated through the auxiliary relay 54. The same result will be obtained if the cut-off device is actuated by an electronic relay connected to the terminals 22, 23 and 24, 25, as will be explained in detail further on.

It has been seen in connection with FIGURE 1 that the two ends of the coils 16 and 17 of the secondary windings of the current intensity transformers 8 and 9 are each connected through a pair of diodes 18, 19 and 20, 21 to the ends 22, 23 and 24, 25 of a symmetrical unit comprising capacitors (26, 27 and 28, 29) and resistors (30, 31 and 32, 33) forming the two auxiliary detection circuits, diagrammatically illustrated by the two dotted-line rectangles A and B.

In accordance with an alternative embodiment of the present invention illustrated in FIGURE 3, the diodes of said auxiliary circuits A and B are replaced by transistors 71, 72 and 73, 74. This modification is intended to increase the power output at the terminals 75, 76 and 77, 78 of the detection circuits, this power increase being necessary to ensure the actuation of the cut-off device of the network which, in this embodiment, as will be explained in detail further on, is a transistorized device common to both blocks A and B and no longer a galvanometric relay per block, as was the case in the embodiment shown in FIGURE 1.

At the outlet terminals 75, 76 and 77, 78 of each auxiliary detection circuit A and B, a capacitor 79, 80 is mounted adapted to eliminate any alternating component at the frequency of the monitoring current. Said blocks A and B comprise, on the other hand, a D.C. source (12 volts) 81, 82 to supply the transistors 71, 72 and 73, 74. The supply for each block can be selectively discontinued for reasons which will be explained in detail further on, by means of switches, preferably push-button switches 83 and 84, for the blocks A and B respectively.

According to a further feature of the invention, the outputs of the two detection circuits A and B are connected in parallel to operate the transistorized common actuating device C which will be described in detail further on. This parallel connection is effected through rectifiers 85, 86. These rectifiers can each comprise either a simple diode as shown by way of example for the block A, or four diodes bridge-connected as shown by way of example for the block B. The paralleling circuitry further comprises a switch, e.g. push-button 87, enabling it to be interrupted at will for reasons which will be later explained.

A further feature of the invention shown in FIGURES 3 and 4 relates to the simplification of the relatively complicated system of taking the reference voltage from the terminals of the generator, which has been described in connection with FIGURE 1 and shown therein.

This simplification comprises taking off the reference voltage, without dephasing, or with a 180° phase-shift, through an auxiliary transformer 88 whose primary winding 88A is connected either (as illustrated) to the outermost terminals 1 and 2 of the secondary winding of the output transformer 7 of the generator 49, or directly to the terminals of said generator.

The auxiliary transformer 88 comprises two identical secondary windings 88B and 88C which enable the reference voltage to be applied to the blocks A and B respectively. In the example illustrated in FIGURE 3, this reference voltage is applied between the center taps of the secondaries 88B and 88C of the voltage take-off transformer 88 and the median points 36, 37 of the auxiliary circuits A and B. The correct phase difference between the voltage at the terminals of the current intensity transformers 8 and 9 and the reference voltage is achieved, in the example shown in FIGURE 3, by adjusting the capacitors 89 and 90 located at the terminals of said current intensity transformers 8 and 9.

If it is desired to apply the simplification feature to the circuit shown in FIGURE 1, it should be understood that the reference voltage would then be applied between the center taps of the secondaries 16, 17 of the current intensity transformers 8 and 9 and the mid-points 36 and 37 of the auxiliary circuits.

Due to the unbalance of the impedances in the network and, in particular, in the supply transformer 70, there could be an active intensity component of the high-frequency monitoring current which would not be negligible in the connection between the center tap 3 of the secondary winding of the output transformer 7 of the generator and the phase 2 line. To overcome this drawback, according to a further feature of the invention, a balancing potentiometer 91, located in the center-tapped connection, is provided enabling the active component of the current at monitoring frequency to be eliminated.

In order to effect, when the device is put into operation, correct setting-up of both the balance (by means of the potentiometer 91) and of the compensation of the active current flowing in the secondary 65 of the network supply transformer 70 (by means of the rheostat 10), a voltmeter (not shown) is connected, for example, through push-button switches, to the terminals 75, 76 of the detection circuit of block A for the adjustment of compensation, and to terminals 77, 78 of the detection circuit of block B, for the adjustment of balance. In order to preclude any interference between the signals emitted from blocks A and B:

The supply 81 for transistors 71, 72 of block A is cut-off by means of the push-button switch 83, when setting-up the balance; and The supply 82 for the transistors 73, 74 of block B is cut-off by means of the push-button switch 84 when adjusting the compensation.

The paralleling circuitry of both detection circuits can also be interrupted as has already been said, by means of the push-button switch 87.

In practice, as the gain of the transistors 71, 72, 73 and 74 is not exactly the same, the amplifications of the two detection blocks A and B are not identical and the signals appearing at the terminals of these two blocks for the same fault value are not equal. In order to overcome the latter drawback it is necessary, when the auxiliary detection circuits A and B are being connected, to weaken the stronger of the two signals by providing a resistance, such as the resistor 92, connected in the circuit at the terminals of the corresponding detection circuit.

As to the circuit C triggering the cut-off means for the network, the galvanometric relays provided in the embodiment described in connection with FIGURE 1 are in this case replaced, except for the auxiliary relay 54, by a transistorized device. This latter device includes three transistors supplied from a D.C. source 93, one being an input transistor 94 which is normally cut-off and only comes back on which a signal of a higher voltage than the bias voltage of the emitter is applied between the base and the emitter, said bias voltage being adjustable by means of a potentiometer 95 which can thus be used to regulate the sensitivity. The intermediate-stage transistor 96 is normally on and cuts off only when the input transistor 94 itself comes on. The power-transistor 97 constitutes the final stage; it is on when the intermediate-stage transistor 96 is cut off, and causes the auxiliary relay 54 to be energized, which relay acts in turn on the triggering coil 98 of the make-and-break switch. The purpose of the Zener diode 132, interposed in the base circuitry of transistor 97, is to fix the base potential of transistor 97 at a suitable value. This arrangement enables the provision for a resistor in the emitter circuitry to be eliminated since such a resistor would limit the available power output.

In accordance with a further feature of the present invention it is possible to control the performance and adjustment range of the device at any moment by means of a test circuit.

In the embodiment exemplified by FIGURE 3 of the drawings, this test circuit comprises two switches, for example, push-button switches 99 and 100, enabling a variable resistance 101 adapted to create an artificial fault to be connected into the circuit, at will, between the conductors 4 and 6 or the conductors 5 and 6. Since this artificial fault is created downstream of the current intensity transformers 8 and 9, but upstream of the connection filters 50, 51, 52 in relation to the generator 49, no filters are necessary.

FIGURE 4 shows the circuit diagram of a further embodiment of a non-selective protection device for a three-phase network.

It has been seen in the example illustrated in FIGURE 3 that the replacement of the galvanometric relays in the trigger device C by transistorized means required an increase in the power output at the terminals of the detection blocks A and B. This was achieved in the previous case by replacing the diodes of the embodiment shown in FIGURE 1 by transistors.

According to the modification shown in FIGURE 4, this same result is obtained by power-amplifying the signal at the outlet of each current intensity transformer 8, 9 by means of a transistorized amplifier unit 102 for the block A and 103 for the block B. The voltage at the amplifier unit output transformer's terminals is then combined with the reference voltage (provided through the auxiliary transformer 88 having two secondary windings, as described in connection with FIGURE 3) in a symmetrical circuit comprising the rectifiers 18, 19, 20, 21, the capacitors 26, 27, 28, 29 and the resistors 30, 31, 32, 33, as described in connection with FIGURE 1 of the drawings.

The correct dephasing between the voltage at the terminals of the transformers 8, 9 and the reference voltage, is effected here by adjusting—

For the block A: The capacitor 89 located at the terminals of transformer 8 and the capacitor 104 located at the outlet terminals of the transistorized amplifier unit 102;

For the block B: The capacitor 90 located at the terminals of transformer 9 and the capacitor 105 located at the outlet terminals of the transistorized amplifier unit 103.

As to the requirement, as has been brought out in connection with FIGURE 3, of weakening the stronger of the two signals supplied by blocks A and B for the same fault, because of the lack of uniformity between the gain of the transistors respective to the two transistorized amplifier units 102 and 103, a resistor 92 is connected into the circuitry when connecting the auxiliary detection circuits, but in this case to the terminals of that current intensity transformer, either 8 or 9, which lies in the circuit supplying the stronger of the two signals for the same fault.

The transistorized trigger means C is identical to that described in connection with FIGURE 3 and its operation will not be repeated here.

The two last-described embodiments (FIGURE 3 and FIGURE 4) relate to the non-selective protection of a three-phase network.

A description will now be given for the application of the invention in providing a seelctive-protection device for a three-phase network, referring to FIGURE 5 of the drawings.

The selective protection of the various lines of a network R is provided by a single generator 49 and as many sets of two detection blocks A and B as there are branches D to be protected.

The injection of the high-frequency monitoring voltage into the network R is achieved in the same way as has already been described in connection with the three previous non-selective embodiments of the invention illustrated in FIGURES 1, 3 and 4. It will therefore not be described again in order not to needlessly lengthen the present description. However, the same references as in the previous figures have been transferred to FIGURE 5.

The current intensity transformers 8 and 9 control the high-frequency current flowing in the branch-line D. However, the primaries of these transformers in this case comprise conductors $D_1$ and $D_2$ of said branch D, it being understood that, as in the previous cases, the transformer 9 connected to the phase P$h$2 of the network R has a primary winding of twice the number of turns than are in the primary winding of transformer 8 connected to the phase P$h$1 of said network. It will be obvious that, from the electrical point of view, the transformers 8 and 9 have primaries through which flows the high-frequency monitoring current of the generator-network circuit, as was the case in each of the previous embodiments.

The set-up of the detection circuits of blocks A and B is identical to that described in connection with FIGURE 4, i.e. with amplification of the intensity signal only; and accordingly will not be described again.

It will be noted that the set-up without amplification, as was the case in the embodiment of FIGURE 1, would not be powerful enough for selective protection and also that the two-transistor set-up per detection block, as in the non-selective protection system described in connection with FIGURE 3, would also not be suitable for selective protection due to the interference frequency of the network which would lead at each half-cycle to the extinction of the output signal of the detection blocks.

The high-frequency reference voltage is taken from between the phases P$h$1 and P$h$3 through a filter 106, comprising an acceptor circuit, or series-connected inductor-capacitor unit tuned to the monitoring frequency, and through two voltage transformers 107 and 108. It will be obvious that it would be equally possible to use, as in the case of FIGURES 3 and 4, a single auxiliary transformer having two secondary windings corresponding respectively to the blocks A and B. The purpose of the diodes 133 and 134 is to absorb the over-voltages which have a deleterious effect on the transistors and which may appear at the outlet of filter 106.

The fact that the reference voltage is taken from between phases P$h$1 and P$h$3 leads to certain special arrangements having to be made which will now be described.

It will be seen that when a short-circuit of very low resistance occurs between phases P$h$1 and P$h$3, the reference voltage becomes very small and the output signal from the detection block A is also very low. If detection were to be merely a question of measuring the watts in this case, i.e. a "wattmetrical" detection system, the device would be capable of detecting high-value faults to the order of 50–100 ohms perfectly, but would not act in the case of plain short circuits. In order to overcome this drawback a signal is taken from the terminals of an auxiliary secondary winding 109 on the output transformer 110 of the transistorized amplified unit 102 of block A. After full-wave rectification by means of a bridge rectifier 111, this signal is applied through a rheostat 112 to the terminals of the trigger device C as the cut-off means for the network, in parallel with the signals emitted by the detection blocks A and B.

This system of detection, which can be called "amperemetrical" must work for faults of a resistance lower than that corresponding to the triggering value even though the "wattmetrical" detection system fails in the case of a fault of such value that the signal at the terminals of the two parallel detection systems is lower than said triggering value. Moreover, the signal at the terminals of the "amperemetrical" detection system alone must be lower than the triggering value for interphase impedances higher than a limit value which is distinctly lower than the minimum impedances of the distribution lines (capacitances) and of the motors which may be present in the network.

It will be seen that by this method non-operative zones of the device are completely eliminated, whilst untimely triggering due to too low impedances inherent to the network is prevented.

The triggering device C is similar to that described in connection with FIGURES 3 and 4 and will not be further described here.

As to the possibility of controlling the performance and adjustment range of the device at any moment by means of a test circuit, this latter comprises, as in the case for the two embodiments described in connection with FIG- URES 3 and 4, two switches, for example push-button switches 99, 100, enabling a variable resistance 101, capable of creating an artificial fault, to be selectively connected between the conductors D1, D3 or D2, D3. However, as the test circuit is connected, in the case of selective protection, to the phases downstream of the transformers 8 and 9, a connection filter 113 has to be provided.

Within the circuitry of the test circuit, there may advantageously be included, in accordance with a further feature of the present invention, an auxiliary circuit per phase connected to the corresponding contacts of the make-and-break switch. The three auxiliary circuits are respectively tuned to the frequency of the monitoring voltage by means of series-connected inductor-capacitor units 114, 115, 116. These circuits further comprise auxiliary contacts 117, 118, 119 which close one fraction of a second before the main contacts of the make-and-break switch.

It will be seen that in this manner the contacts of the make-and-break switch are short-circuited at the monitoring frequency a very short time before it closes, which enables the section of the network to be protected to be checked before the energization thereof and, should a fault be present therein, enables the closing of the make-and-break switch to be prevented by acting on the optimum or current emission coils of said make-and-break switch.

It will be obvious that this additional protection device can likewise be combined with the embodiments described by way of example in connection with FIGURES 3 and 4.

The application of the invention to the non-selective protection of a one-phase A.C. network or of a D.C. network will now be described with reference to FIGURES 6 and 7 of the drawings. In the circuitry shown by way of example in these figures, a means for obtaining the reference voltage similar to that in FIGURE 1 has been shown, it being understood that it would be possible, within the scope of the invention, to use the means for obtaining the reference voltage of the type shown in FIGURES 3 and 4.

The circuitry of the non-selective protection device on a single-phase A.C. network (FIGURE 6) comprises a singlephase generator 49, supplying a high-frequency voltage through a transformer 7. The two ends 1 and 2 of the secondary winding of transformer 7 are each connected to one of the network conductors through inductor-capacitor filters 50 and 52 tuned to the monitoring frequency. The device for detecting the active current component comprises a current intensity transformer 8 supplying, at the terminals of its secondary winding 16, a voltage $V_s$ which is a function of the intensity flowing through the conductor 4 and having an auxiliary winding 11 mouted thereon to compensate for the ampere-turns developed by the active current flowing from the source S. The two extremities of the secondary winding of transformer 8 are connected through a pair of diodes 18, 19 to the terminals of a unit comprising resistors (30, 31) and capacitors (26, 27). A reference voltage $V_{tr}$, out of phase with respect to the voltage $V_{1-2}$ between terminals 1 and 2 by the same phase angle as is the voltage at the terminals of the secondary winding of the transformer 8 with respect to the current flowing in the conductor 4, is applied between the center tap of the secondary winding of transformer 8 and the mid-point 36 of the resistor-capacitor unit (30, 31 and 26, 27). This voltage $V_{tr}$ is taken directly from the terminals 57, 58 of a phase-shifting circuit connected to the secondary winding of the transformer 7, or from the the terminals 55 and 56 of a device itself connected to the terminals 57, 58 of the phase-shifting circuit and providing a constant-amplitude voltage at its outlet terminals 55 and 56. The device includes a step-up transformer 43, a limiter unit consisting of resistors 59, 60 and Zener diode 44, and a filter 45 tuned to the monitoring frequency.

The refenece voltage $V_{tr}$ can likewise to taken from the terminals of a phase-shifting system connected to the primary winding of transformer 7, as shown in FIGURE 2.

It can also be taken directly from the terminals of either the primary or the secondary winding of the transformer of generator 49, as in FIGURES 3 and 4.

The D.C. component of the voltage appearing at the terminals 22 and 23 of the resistor-capcitor unit is a function of the product $IV_s \times \cos\phi$, i.e. of the active current component. Since the active current component only appears in the event of a short-circuit, the D.C. component $V_{dc}$ only appears in the case of a fault and appears through the relays 48 and 54 or an electronic amplifier which causes the cut-off member 53 to function. The cutting-off of the monitoring current on the source side is effected by means of parallel-connected condenser 66 in the case of a single-phase network. However, in the case of a D.C. network, this monitoring current cut-off on the source side can be achieved by means of a rejector circuit tuned to the monitoring frequency, as shown in FIGURE 7 and as is known per se. This solution is necessary if the network is supplied through rectifiers. In this case compensation of the active current becomes unnecessary and the winding 11 can be omitted, the other elements of the monitoring circuit being the same as in FIGURE 6.

The application of the device to provide a selective-protection device for a trolley network will now be described with reference to FIGURES 8 and 9.

In the example considered, the single conductor R is supplied by a group of rectifiers 120, through a rejector circuit 121 tuned to the monitoring frequency and whose purpose is to increase the impedance of the supply source. The return of the current is effected through the rail (not shown).

The circuit for injecting the monitoring voltage into the network comprises in this case a generator 49, one end of whose output transformer is connected to the network line R by a connection filter comprising a series-connected inductor-capacitor unit or acceptor circuit 50 tuned to the monitoring frequency, the other end of this output transformer of generator 49 being connected without a filter to earth at 122 since the return is effected through the rail.

The detection is in this case identical to that described in connection with the selective protection of the three-phase networks (see FIGURE 5 and the corresponding text in the description), with the sole difference that the active component of the high-frequency current is monitored on a single conductor and that there is accordingly only a single detection block, for example A, instead of two.

The reference voltage can be taken from between the trolley wire R and earth through a filter 106 consisting of an acceptor circuit or series inductor-capacitor unit tuned to the monitoring frequency and thence through a transformer 107.

In this case an "amperemetrical" form of protection must likewise be provided for the same reasons as those put forward for the selective protection of three-phase networks as in FIGURE 5. This "amperemetrical" protection will not be described again it being understood that all the elements thereof shown in FIGURE 5 have been re-introduced into FIGURE 8 with the same references.

It is likewise possible, and this will be the most frequent case, to take the reference voltage from the outlet terminals of the generator 49. Accordingly, any drop in the reference voltage to a too low value is avoided due to the impedance of the connection filter 50 between the generator 49 and the network R. In this case the "amperemetrical" protection provided by the secondary winding 109, the bridge-rectifier 111 and the rheostat 112, becomes useless.

The triggering device C is identical to that described in connection with FIGURES 3, 4 and 5, and will not be described again.

As in the earlier-described cases, the performance and adjustment range of the device can be controlled at any moment by means of a test circuit which comprises, downstream of the current intensity transformer 8, a filter 123 tuned to the monitoring frequency, a switch, for example a push-button switch 124, and an adjustable resistor 125.

A circuit of the same type comprising a filter 126 tuned to the monitoring frequency, a low-valued resistor 127 (of a much lower value than that necessary to reach the limit of adjustment) and a switch, for example a push-button switch 128, can be installed from place to place along the network to ensure the cut-off of said network in the case of emergency.

It will be appreciated that it is perfectly possible to provide a test-circuit without a filter, by branching a conductor 129 series-connected with an auxiliary winding of the current-transformer 8, an adjustable resistor 130 and a switch, for example push-button switch 131, between the terminals of the generator 49 and earth.

As in the case of the selective-protection device for the three-phase network described in connection with FIGURE 5, an additional protection circuit may advantageously be provided comprising a filter 114 tuned to the monitoring frequency and an auxiliary contact 117 which is closed a fraction of a second earlier than the make-and-break switch, this additional circuit being connected to the contact terminals of said make-and-break switch.

As has already been explained, the contacts of the make-and-break switch are short-circuited at the monitoring frequency a very short time before it closes, whereby the section of the network is tested before being energized and, in the event of a fault, this energization is prevented.

In accordance with a preferred modification illustrated in FIGURE 9 of the drawings, the tuned circuit 114 is permanently connected to the contact terminals of the make-and-break switch. In order to prevent the current charge of condenser 135 of the tuned circuit from passing through any person who may accidentally touch the wire of the trolley, a high-value resistor 136 is connected, downstream of the make-and-break switch, between the trolley and earth, so that when the make-and-break switch is open condenser 135 can charge up to the potential of the network and the trolley potential can be brought down to earth potential.

What is claimed is:

1. In a device for the protection against short circuits of an electrical network comprising a power-supply transformer and a cut-off member for said network, the combination of a high frequency generator supplying an A.C. monitoring voltage of very much higher frequency than the industrial frequency, a transformer to couple said high frequency generator to the electrical network, detection means operatively connected to said high frequency generator to actuate said cut-off member in the event of a short circuit in the network, current intensity transformer means connected between said high frequency generator and the electrical network, said current intensity transformer means supplying a voltage which is a function of the monitoring current intensity, said detection means being selective of the active current component in the high frequency generator-electrical network connecting circuitry, responsive to the voltage which is a function of the monitoring current intensity flowing in the high frequency generator and electrical network circuitry exclusive of the power supply transformer, and also responsive to a reference voltage of a constant phase difference with respect to the voltage at the outlet terminals of said high frequency generator, an auxiliary circuit including an auxiliary secondary winding mounted on said current intensity transformer means, and a resistor having one connection to said transformer operatively connected to said high frequency generator and another connection to said auxiliary secondary winding, said auxiliary circuit compensating for the active current intensity flowing in the network power-supply transformer.

2. The combination in the device of claim 1 further characterized by at least one additional current intensity transformer means, an auxiliary compensation circuit for each current intensity transformer means and an auxiliary network of variable resistance.

3. The combination in the device of claim 1 further characterized by said high frequency generator being a single phase generator.

4. The combination in the device of claim 3 wherein the network to be protected is a three-phase network and the secondary winding of said coupling transformer connected to said high frequency single phase generator is connected to the three phases of the network by its extremities and by its center tap, respectively.

5. The combination in the device of claim 1 wherein the network to be protected is a single phase network and the secondary winding of said coupling transformer from said high frequency generator is connected to the two conductors of the network by its extremities.

6. The combination in the device of claim 1 wherein the network to be protected is a single line trolley network with return through the rail and the network is supplied through a plurality of rectifiers and the coupling transformer from the high frequency generator has one extremity thereof connected to the network line and its other extremity to earth.

7. The combination in a device according to claim 1 wherein said reference voltage is taken directly from the outlet terminals of said high frequency generator.

8. The combination in a device according to claim 1 wherein said reference voltage is amplified by means of a transformer limited by means of Zener diodes and resistors, and filtered.

9. The combination in accordance with claim 7, wherein said reference voltage is amplified by means of a transformer limited by means of Zener diodes and resistors, and filtered.

10. The combination in accordance with claim 1 wherein the reference voltage is taken from the terminals of the primary winding of said coupling transformer connected to said high frequency generator, and thereafter dephased by means of a resistor condenser system.

11. The combination in accordance with claim 1 further characterized by said detection means comprising a symmetrical rectifier-resistor-capacitor unit and the reference voltage being applied between the center tap of the secondary winding of said current intensity transformer means and the midpoint of said detection means.

12. The combination in accordance with claim 1 further characterized by said detection means comprising a symmetrical transistor-resistor-capacitor unit and the reference voltage being applied between the center tap of the secondary winding of said current intensity transformer means and the midpoint of said detection means.

13. The combination of claim 1 further characterized by a power amplifier which amplifies the signal appearing at the terminals of the secondary winding of said current intensity transformer means before the voltage resulting therefrom is combined with the reference voltage.

14. The combination in accordance with claim 1 further characterized by an auxiliary transformer whose primary winding is connected to the terminals of the secondary winding of said transformer coupling, said high frequency generator connected to the network adapted to take off the reference voltage, said detection means comprising a symmetrical transistor-resistor-capacitor unit, said detection means being fed by the secondary winding of said auxiliary transformer and being parallel connected through rectifiers and connected to the terminals of said cut-off member, said current intensity transformer means with primary windings which are each fed through a conductor connected between said high frequency generator and the electrical network and secondary windings which supply the voltages which are a function of the intensity of the monitoring current, said voltages being applied between the center tap of the corresponding secondary winding of said auxiliary transformer adapted to take off the reference voltage and the midpoint of the symmetrical unit of the corresponding detection means.

15. The combination in accordance with claim 1 further characterized by as many sets of two detection means as there are branches of the network to be detected, said current intensity transformer means being adapted to control the high frequency current flowing through each branch, each having the primary winding thereof comprised by one of the conductors of said branch, the reference voltage being taken from between two conductors of the said branch through a filter tuned to the high frequency of the monitoring current.

16. The combination in accordance with claim 1 wherein an additional auxiliary circuit is provided adapted to introduce at will an artificial fault at the high frequency of the monitoring voltage, said fault causing a signal to be emitted at the outer terminals of the selective device actuating the network cut-off member.

17. The combination in accordance with claim 1 wherein an additional auxiliary circuit is provided enabling the insulation between the phases of the network being monitored to be checked before energization, said additional auxiliary circuit being tuned to the high monitoring frequency and comprising means which short-circuit the contacts of the network cut-off member at said high frequency, thereby preventing the network's energization.

References Cited by the Examiner
UNITED STATES PATENTS

| | | | |
|---|---|---|---|
| 1,831,338 | 11/31 | Brown | 317—29.1 |
| 1,871,724 | 8/32 | Moss | 317—29.1 |
| 2,182,641 | 12/39 | Poleck | 317—36 |
| 2,735,962 | 2/56 | Ellis | 317—29.1 |
| 2,775,725 | 12/56 | Ellis | 317—36 |
| 2,897,406 | 7/59 | Lensner | 317—36 |
| 3,019,373 | 1/62 | Kramer | 317—18 |
| 3,119,049 | 1/64 | Gagniere | 317—9 |

SAMUEL BERNSTEIN, *Primary Examiner.*

MAX L. LEVY, *Examiner.*